United States Patent [19]
Kelly et al.

[11] 3,936,673
[45] Feb. 3, 1976

[54] AUTO DOOR LOCK ALARM

[76] Inventors: John F. Kelly, 393 Britton Ave., Staten Island, N.Y. 10304; Frank Rizzo, 200 Catherine St., Staten Island, N.Y. 10302

[22] Filed: Feb. 24, 1975

[21] Appl. No.: 552,306

[52] U.S. Cl. ............... 307/10 AT; 200/44; 340/63; 70/379 R
[51] Int. Cl.² .......................................... B60R 25/00
[58] Field of Search..... 340/63; 307/10 AT; 200/44, 200/42 R; 70/379 R, 239; 180/114, 112

[56] References Cited
UNITED STATES PATENTS

| | | | |
|---|---|---|---|
| 2,615,083 | 10/1952 | Krueger | 307/10 AT |
| 2,782,396 | 2/1957 | Marsh et al. | 340/63 |

*Primary Examiner*—Herman Hohauser
*Attorney, Agent, or Firm*—Richard L. Miller

[57] ABSTRACT

A combination key operated vehicle door lock and burglar alarm switch having a cylinder lock which is mounted on the vehicle door and operated by a prescribed key. A semi-circular shaft axially extends from the cylinder lock and supports a latching device which is utilized for controlling the opening and closing of the door, as well as a switch device which is utilized for completing the electrical circuit of the burglar alarm system. The single key is utilized to both operate the opening of the door as well as the arming of the burglar alarm.

10 Claims, 5 Drawing Figures

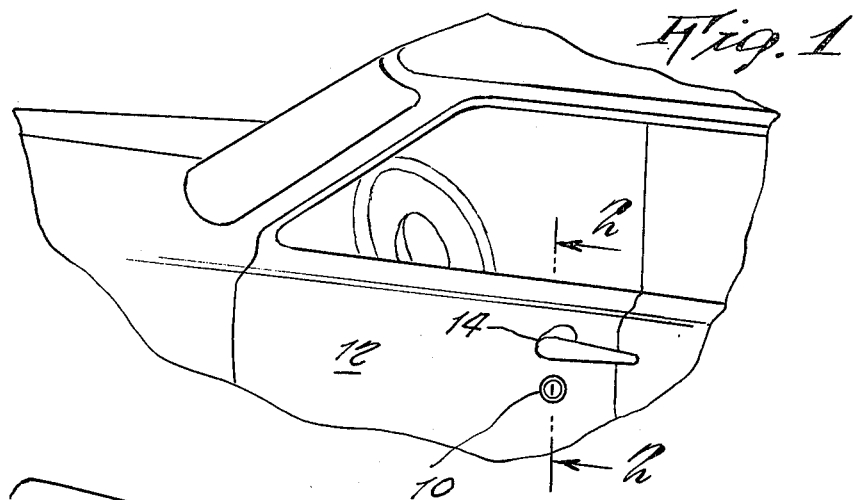
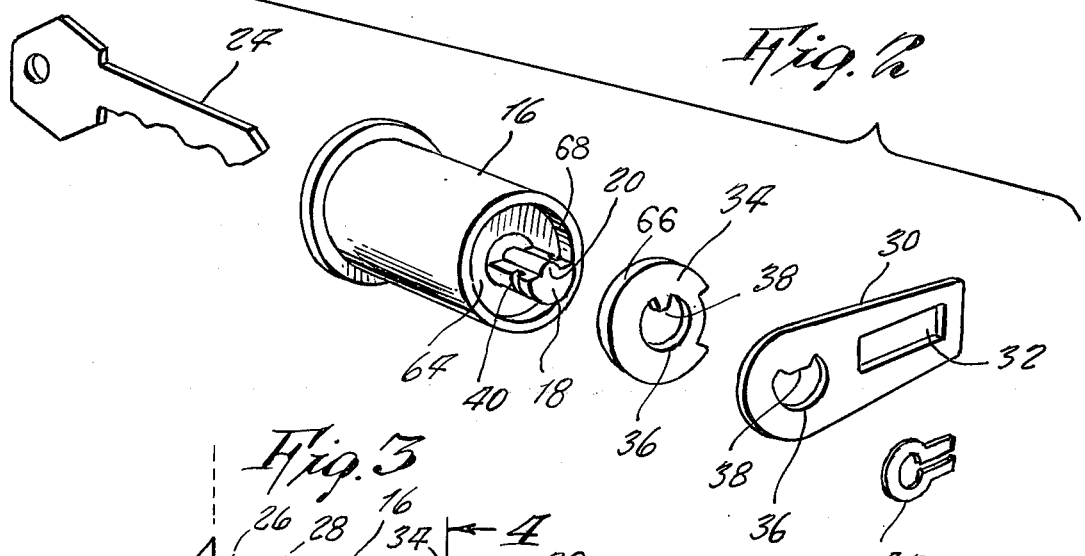
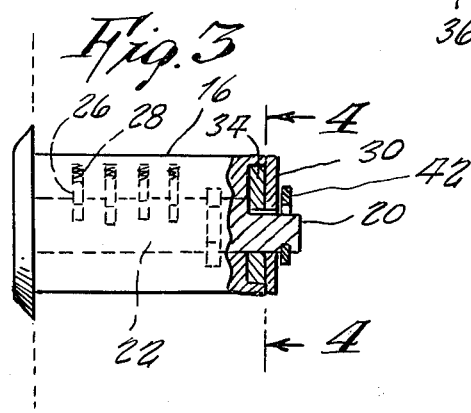
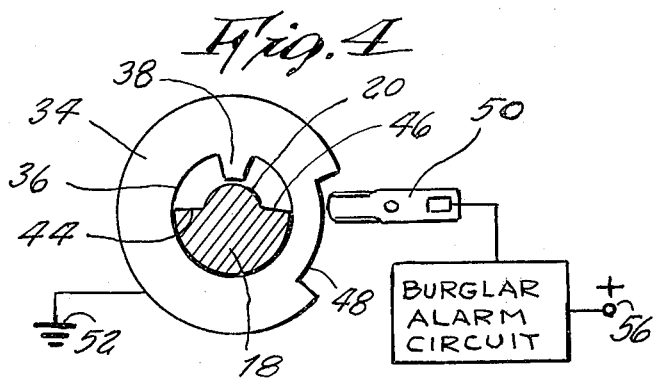
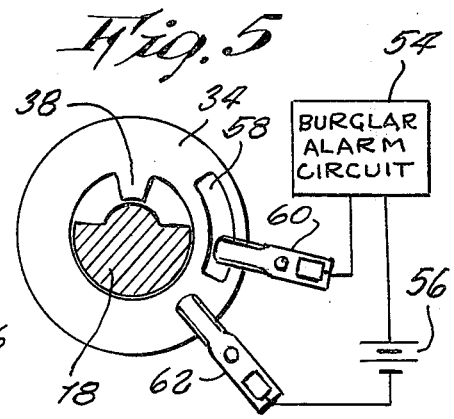

AUTO DOOR LOCK ALARM

SUMMARY OF THE INVENTION

This invention relates to door locks and more particularly to a combination key operated vehicle door lock and burglar alarm switch.

With an increase in the number of burglaries of automobiles it is quite common to install burglar alarms on vehicles. The alarms require an activating switch which is operated by the authorized user when he leaves the vehicle. The activating switch is generally available external to the vehicle so that when the operator parks the car or leaves it for an extended period of time, he can activate the burglar alarm so that it will detect any unauthorized entry and sound the alarm. When the operator returns to the vehicle, the burglar alarm is deactivated so that the operator can re-enter the vehicle without sounding the alarm. The activating switch is frequently a key operated switch having a first position wherein the alarm is deactivated and a second position at a 90° angle from the first position wherein the alarm is actived. The key operated burglar alarm switch is placed at a convenient location such as at the front bumper or the rear bumper, and must be operated after the driver leaves the vehicle.

While conventional key operated burglar alarm switches are quite prevelant, they have not been as effective as possible because of the inconvenience involved in using them. Thus, when the operator of the vehicle leaves the vehicle, he generally locks his car but finds it inconvenient to walk to the front bumper or rear bumper and indepently operate the burglar alarm key switch to activate it. As a result, the operator often leaves the vehicle without activating the burglar alarm. Similarly, when the operator returns, he must first go to the bumper and deactivate the burglar alarm and subsequently return to the door and open it. Because of the inconvenience involved, the operator will frequently neglect to deactivate the burglar alarm and a false alarm will be triggered. These situations are especially aggravated when the operator must enter and exit his vehicle numerous times a day.

Accordingly, in accordance with the present invention, there is provided a combination key operated vehicle door lock and burglar alarm switch which operates by means of a single key to simultaneously open and close the door of the vehicle and at the same time activate and deactivate the electrical circuit of a burglar alarm system. As a result, by means of a single key, when the operator comes to the vehicle he can simultaneously open the door and deactivate the burglar alarm. Similarly, by means of the same key, when leaving the vehicle, he can lock the door and at the same time activate the burglar alarm. Utilizing this arrangement, the inconvenience of having a separate key operated burglar alarm switch is eliminated and each and every time the vehicle is locked, the burglar alarm will automatically be activated.

However, a special problem is encountered in connection with vehicle door locks. With most cylinder locks, such as are used in houses, there is a first position where the lock is closed and a second position where the lock is open, wherein the second position is generally at 90° or at 180° with respect to the first position. Thus, a key is inserted into the lock, rotated a prescribed number of degrees and removed from its new position. Therefore, the key will be inserted and removed in different positions. However, in conventional vehicle door locks the key is inserted, rotated an arcuate number of degrees in one direction and then rotated back to its initial position where it is removed. Similarly, when closing the vehicle, the key is inserted, rotated an arcuate number of degrees in the opposite direction, and again it is returned to its initial position for removal. Thus, in vehicle door locks the key is inserted and removed in its identical position. The opening and closing is achieved by turning the key a requisite number of degrees in either of the two directions. However, the key is always removed from the same position. Therefore, in order to provide the combination vehicle door lock and burglar alarm switch of the present invention, it is necessary to provide a unique combination of parts with a unique structure in order to permit the conventional vehicle door lock to simulataneously operate the door lock and a switch means interconnected to the electrical circuit of a burglar alarm.

It is therefore an object of the present invention to provide a combination key operated vehicle door lock and burglar alarm switch.

A further object of the present invention is to provide a cylindrical lock for a vehicle wherein a single key can unlock the door and simultaneously deactivate the burglar alarm.

Another object of the present invention is to provide a vehicle door lock which also serves to operate a switch for a burglar alarm, wherein the key is inserted and removed in the same position.

Yet another object of the present invention is to provide a simple, inexpensive and easily installed combination key operated vehicle door lock and burglar alarm switch.

These and other objects, features and advantages of the invention, will, in part, be pointed out with particularity and will, in part, become obvious from the following more detailed description of the invention, taken in conjunction with the accompanying drawings which form an integral part thereof.

SUMMARY OF THE INVENTION

Briefly, the invention describes a combination key operated vehicle door lock and burglar alarm switch comprising a cylindrical lock adapted to be mounted on the vehicle door and including an approximately semi-circular shaft axially extending toward the inside of the door and capable of being rotated an arcuate amount in either direction by a proper key. A latch means which controls the opening of the door is rotatably mounted on the shaft. A switch means which completes the electrical circuit of the burglar alarm is also rotatably mounted on the shaft. Both the latch means and the switch means include a circular opening through which the shaft is located. A notched portion extends into the circular openings above the semi-circular shaft. Using this combination, when the semi-circular shaft is rotated in one direction, it engages the notched portions of both the latch means and switch means to rotate both said last mentioned means in one direction, whereby the door opens and simultaneously the electric circuit is opened. When the shaft is rotated in the opposite direction, it engages the notch portions of both the latch means and the switch means, whereby both said last mentioned means are rotated in the opposite direction to thereby lock the door and complete the electric circuit of the burglar alarm.

BRIEF DESCRIPTION OF THE DRAWING

In the drawing:

FIG. 1 is a view of the lock of the present invention located on a car door as viewed from the outside;

FIG. 2 is an exploded isometric view of the lock in accordance with the present invention;

FIG. 3 is a side view of the lock including a partially cut-away section;

FIG. 4 is a sectional view taken along line 4—4 of FIG. 3 schematically coupled into the burglar alarm system; and FIG. 5 is a sectional view, similar to the view shown in FIG. 4 and showing an alternate embodiment of the present invention schematically coupled into the burglar alarm system.

In the various figures of the drawing, like reference characters designate like parts.

DESCRIPTION OF THE PREFERRED EMBODIMENTS

Referring now to the FIGS. 1–3, there is shown the lock of the present invention shown generally at 10. It is noted that the lock is mounted as a conventional vehicle lock and is located on the door 12 of a vehicle below the door handle 14. The lock comprises a typical cylinder lock portion 16 and includes an axially extending semi-circular shaft 18 which passes from the rear of the lock. The shaft includes a circular central hub 20 which is directly coupled to the cylinder 22 in the center of the cylindrical lock 16. The cylindrical lock is operated by means of a key 24 which is inserted within the cylindrical lock.

As is well known, the lock includes a number of pin tumblers 26 of different lengths and each having two segments. The pins are pressed down by springs 28 to engage with holes in the cylinder 22 thereby preventing the cylinder from rotating. When the proper key is inserted into the lock, lower segments of the pin tumblers are raised by exactly the correct amount to bring their tops flush with the outer surface of the cylinder. As the two segments of each tumbler are separate and not interconnected, the cylinder is then free to rotate when the key is turned.

Positioned on the semi-circular shaft is a latch device 30 which includes an opening 32 to which a bolt is coupled to open and close the vehicle door, as is well known in the art. A disk like switch plate 34 is also positioned on the shaft 18 which is utilized to electrically complete the circuit of the burglar alarm.

Both the switch plate 34 and the latch device 30 include a central opening 36 of generally circular shape which is fitted to just pass over the shaft 18. A notched portion 38 extends downward into the circular opening 36 and is positioned to be above the semi-circular shaft when the switch plate 34 and the latch device 30 are positioned on the shaft. The notched portion 38 occupies less than a semi-circle. An annular groove 40 is located on the semi-circular shaft to accommodate a fastening clip 42 which is positioned outwardly of both the switch plate 34 and the latch device 30 to retain the last two items in position on the shaft.

The operation of the cylindrical lock to control the activation of the burglar alarm can best be explained with regard to FIG. 4. In conventional vehicle door locks, the key is inserted into the cylindrical lock and is rotated in one direction a fixed number of degrees whereby the door is opened. The key is then returned to its initial position and removed. Similarly, to lock the door, the key is inserted and the lock turned in the opposite direction, whereupon the key is again returned into its initial position for removal. Therefore, the key is always inserted and removed in the same upright position. The switch plate must therefore be of a structure to accommodate this type of operation of a key and a cylindrical lock. It is noted that the semi-circular shaft 18 will rotate in the same direction as does the key. As the semi-circular shaft 18 rotates in one direction, for example, clockwise, the edge 44 of the semi-circular shaft will engage the left portion of the notch 38 and will cause the plate 34 to rotate in a clockwise direction. However, the shaft 18 can then be returned to its initial position without having the plate 34 moved, since the edge 44 will no longer engage the notched portion and the edge 46 will not have reached the opposite edge of the notch 38. The semi-circular shaft can rotate in the open space of the circular opening 36. When the key is subsequently inserted and turns the cylindrical lock in the opposite direction, the edge of the semi-circular shaft 46 will now engage the notch 38 on its opposite side and as the semi-circular shaft rotates in a counter clockwise position it will cause the plate 34 to also rotate in a counter clockwise position. However, again the shaft can be returned to its initial position for removal of the key without causing the plate to return to its original position.

In the embodiment shown in FIG. 4 the plate 34 is made of conductive material and a cutaway section 48 is located along a portion of the circumference of the plate. A contact terminal 50 is positioned adjacent the circumference of the plate 34 such that when the plate is rotated, the terminal 50 will engage the circumference of the plate itself. However, when the cutaway portion 48 is adjacent the terminal 50 there will not be any contact to the terminal. One end of the circuit, for example the ground terminal 52, is coupled to the conductive plate 34, while the other part of the burglar alarm circuit 54, together with the energy source 56, is coupled to the terminal 50.

In operation, when the key is inserted in the cylindrical lock and the shaft 18 is rotated in a clockwise direction, the plate 34 will also rotate in a clockwise direction whereby the terminal 50 will contact the plate 34 and the electrical circuit will be completed thereby activating the burglar alarm. The key can then be removed in its same original position in which it was inserted without effecting the burglar alarm circuit. Subsequently, the key is again inserted in the lock and the shaft is now rotated in a counter clockwise position whereby the plate 34 will also rotate in a counter clockwise direction. When the cutaway section 48 reaches the terminal 50, the burglar alarm circuit will be open and the circuit will be deactived. The key can again be turned to be removed in the same position in which is was inserted, without effecting the burglar alarm.

Referring now to FIG. 5 there is shown an alternate embodiment of the present invention wherein the same structure is noted except that the plate 34 is now made of non-conductive material and there is located a conductive strip 58 along the surface of the plate 34. Two terminals are utilized 60, 62, which are interconnected to two ends of the burglar alarm circuit 54 in series with battery 56. As the shaft 18 is rotated in a clockwise direction, it will engage the notched portion 38 to cause the plate 34 to rotate in a clockwise direction until the terminals 60 and 62 are both in contact with the electrical conductor strip 58 thereby electrically interconnecting the terminals 60, 62 and completing the series circuit of the burglar alarm to activate it. Subsequently, when the shaft 18 is rotated in a counter clockwise direction it will engage the notch 38 to turn the plate 34 in a counter clockwise direction until the terminals 60 and 62 will no longer both be in contact with the conductor strip 58 and the circuit will now be opened, and the burglar alarm deactivated. It is understood that one of the terminals 60 or 62 could be connected to a ground terminal as was shown in connection with FIG. 4.

For convenience, as shown in FIG. 3, the cylindrical lock 16 can include a recessed base portion 64 which can accommodate the switch plate 34, so that the latch device 30 will abut the end of the cylindrical lock and will not necessarily protrude any further even though the lock now includes the switch plate 34.

Since the latch device 30 also includes the notched portion 38 in its central opening 36, the same key which serves to open and close the electrical circuit utilizing the switch plate 34 will also serve to open and close the vehicle door. Thereby, utilizing the same single key, when it is rotated in a first direction both notched portions are engaged to rotate the latch device 30 and the switch plate 34 in one direction to open the door and simultaneously open the electrical circuit of the burglar alarm. When the key turns the shaft in an opposite direction, it engages the notched portions of both the latch device and the switch plate to rotate them in the opposite direction to thereby lock the door and simultaneously complete the electrical circuit of the burglar alarm.

Since the latch device 30 and the switch plate 34 are both free to rotate relative to each other on shaft 18 it is obvious that if latch device 30 is rotated by conventional mechanism not shown contained in door 12 when door is being locked or unlocked from inside vehicle that switch plate 34 will not rotate.

It is also important that there be sufficient friction between surfaces 68 of lock 16 and surface 66 of plate 34 so that plate 34 will not rotate due to vibration or other false inputs.

There has been disclosed heretofore the best embodiments of the invention presently contemplated. However, it is understood that various changes and modifications may be made thereto without departing from the spirit of the invention.

What is claimed is:

1. A combination key operated vehicle door lock and burglar alarm switch comprising:
    a. a cylindrical lock adapted to be mounted on a vehicle door including, an approximately semi-circular shaft axially extending therefrom and capable of being rotated an arcuate amount of either direction by a key;
    b. latch means for controlling the opening of the door, rotatably mounted on said shaft, and
    c. switch means for completing the electrical circuit of a burglar alarm, also rotatably mounted on said shaft, each of said latch means and said switch means including, a circular opening receiving said shaft and a notched portion extending into the circular opening above the semi-circular shaft, whereby when said semi-circular shaft is rotated in one direction, it engages both said notched portions to rotate said latch means and said switch means in one direction to open the door and simultaneously open the electrical circuit, and when said shaft is rotated in the opposite direction it engages both said notched portions to rotate said latch means and said switch means in said opposite direction to lock the door and simultaneously complete the electric circuit.

2. The combination of claim 1 and wherein said notched portion occupy less than a semi-circle of said circular opening.

3. The combination of claim 1 and wherein said switch means comprises a disk of conductive material with a cut out section along the circumference thereof, and wherein said circular opening is concentrically located in said disk, and said switch means is sufficiently restrained from rotating by friction means.

4. The combination of claim 3 and further comprising a contact element connected to one side of the burglar alarm circuit and positioned with respect to said disk to engage said disk at the circumference thereof, said conductive disk being connected to the other side of the burglar alarm circuit.

5. The combination of claim 1 and wherein said switch means comprises a disk of non-conductive material with a strip of conductive material located on a section thereof, and wherein said circular opening is concentrically located in said disk.

6. The combination of claim 5 and further comprising first and second contact elements each respectively connected to opposite ends of the burglar alarm circuit and positioned with respect to said disk to be able to electrically contact said conductive strip.

7. The combination of claim 1 and wherein said cylindrical lock includes a recessed base, said shaft extending from said base, and wherein said latch means fits into said recess.

8. The combination of claim 1 and wherein said semi-circular shaft includes a circular hub at the center thereof, said circular hub being an extension of the center cylinder of the cylinder lock.

9. The combination of claim 8 and wherein said shaft contains an annular groove positioned rearward of said latch means and said switch means and further comprising fastening means adapted to clip into said annular groove for retaining said latch means and said switch means of said shaft.

10. The combination of claim 1 and wherein said cylindrical lock comprises a plurality of tumbler pins and a center cylinder, the tumbler pins being spring held into position in the center cylinder.

\* \* \* \* \*